United States Patent
Wu et al.

(10) Patent No.: US 8,036,476 B2
(45) Date of Patent: Oct. 11, 2011

(54) IMAGE ENCODING/DECODING DEVICE AND METHOD THEREOF WITH DATA BLOCKS IN A DETERMINED ORDER

(75) Inventors: Wen-Che Wu, Hsin-Chu Hsien (TW); Hsien-Chun Chang, Chi-Lung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1027 days.

(21) Appl. No.: 11/874,214

(22) Filed: Oct. 18, 2007

(65) Prior Publication Data

US 2008/0095454 A1    Apr. 24, 2008

(30) Foreign Application Priority Data

Oct. 18, 2006  (TW) ............................... 95138330 A
Nov. 24, 2006  (TW) ............................... 95143560 A

(51) Int. Cl.
*G06K 9/36*    (2006.01)
(52) U.S. Cl. ......... 382/233; 382/234; 382/246; 708/203
(58) Field of Classification Search .................. 382/233, 382/234, 246; 708/203
See application file for complete search history.

(56) References Cited

U.S. PATENT DOCUMENTS

| | | | | |
|---|---|---|---|---|
| 5,057,917 A | * | 10/1991 | Shalkauser et al. | ...... 375/240.12 |
| 5,363,097 A | | 11/1994 | Jan | |
| 5,376,971 A | * | 12/1994 | Kadono et al. | ............... 348/699 |
| 5,440,706 A | * | 8/1995 | Juri et al. | ..................... 711/202 |
| 5,654,703 A | | 8/1997 | Clark, II | |
| 5,923,813 A | * | 7/1999 | Okamoto et al. | ............ 386/208 |
| 6,956,511 B2 | | 10/2005 | Thomas | |
| 2003/0208666 A1 | | 11/2003 | Jeddeloh | |
| 2005/0074177 A1 | | 4/2005 | Ichimura | |
| 2006/0083432 A1 | * | 4/2006 | Malvar | ......................... 382/232 |

FOREIGN PATENT DOCUMENTS

| JP | 200145498 | 2/2001 |
|---|---|---|
| JP | 2001308715 | 11/2001 |
| JP | 2005341076 | 12/2005 |

* cited by examiner

*Primary Examiner* — Vikkram Bali
*Assistant Examiner* — Eueng-Nan Yeh
(74) *Attorney, Agent, or Firm* — Winston Hsu; Scott Margo

(57) ABSTRACT

The invention provides an image encoding/decoding device and method. An encoding/decoding architecture of the invention includes: encoders for encoding image data into data blocks; a reordering multiplexer for receiving the data blocks and determining an order by which the data blocks are written into a memory according to an order of an achieved percentage of an encoding progress for each encoder; a memory writing unit, a memory dispatcher, a memory controller, and a memory reading unit, for writing the data blocks into the memory and reading the data blocks from the memory; a request demultiplexer for receiving the read data blocks from the memory reading unit and outputting the received data blocks according to data request signals; and decoders for generating the data request signals, receiving the output data blocks from the request demultiplexer, decoding the received data blocks, and then outputting the decoded data blocks.

16 Claims, 3 Drawing Sheets

IMAGE ENCODING/DECODING DEVICE AND METHOD THEREOF WITH DATA BLOCKS IN A DETERMINED ORDER

BACKGROUND OF THE INVENTION

1. Field of the Invention

The present invention relates to an encoding/decoding device and method thereof, and more particularly, to an image encoding/decoding device and method thereof.

2. Description of the Prior Art

Currently, capability of display devices has advanced from simply processing two-dimensional pixels in a current picture to processing pixels at the same location respectively in a previous picture and the current picture, thereby upgrading picture quality. It has thus become an essential hardware expense to utilize a memory for storing pixels in the previous picture. Also, it is thus an important and desirable solution to reduce the amount of pixel data by some compression technology. Moreover, the previous picture requires lossless compression because pixel values of the previous picture should be perfectly recoverable after compression. One common lossless compression method is the variable length coding (VLC) encoding method. With the VLC encoding method, the address of the current data cannot be available unless the previous data has been decoded. Therefore, in a case that three channels (e.g. RGB or $YC_bC_r$ channels) of data are required to be stored in a display device at a time, the three channels may need to be encoded/decoded separately if the corresponding VLC encoder/decoder cannot perform all encoding/decoding processes for the three channels in a unit time interval for displaying one pixel. Also, in such a case, how to achieve the best compression effect by utilizing the same memory for storing compressed data of the three channels is an important issue. When the desired compression effect cannot be achieved utilizing a memory with a fixed volume, important data may need to be stored into the memory in a partly recoverable manner. The so-called best compression effect hereinabove thus corresponds to the percentage of success in compressing different pictures.

In the prior art, a typical way to share a memory is to divide the memory space into three separate memory areas. A channel in low compression cannot take advantage of the remaining available space of a memory area for a channel in high compression in such way, however. Moreover, the corresponding memory controller should operate in a three-read-three-write manner instead of a one-read-one-write manner, thereby increasing complexity and decreasing efficiency of the memory controller. Another conventional way to share a memory is to divide the memory space into a plurality of memory units having the same fixed volume and label each memory unit with a code corresponding to one of the three channels. In such way, the labels have to occupy some memory space, thereby reducing the memory space available for the compressed picture. In an application where the memory is an important resource, this drawback is too obvious to be ignored.

SUMMARY OF THE INVENTION

It is therefore one of the objectives of the present invention to provide an image encoding/decoding device and method thereof, to solve the above mentioned problems.

According to a preferred embodiment of the present invention, an encoding/decoding architecture of the present invention comprises: a plurality of variable length coding (VLC) encoders, for encoding R, G, B video data into R, G, B data blocks respectively and outputting the R, G, B data blocks; a reordering multiplexer, for receiving the R, G, B data blocks output from the VLC encoders and determining an order by which the R, G, B data blocks are written into a memory according to an order of an achieved percentage of an encoding progress for each VLC encoder; a memory writing unit, for receiving the R, G, B data blocks output from the reordering multiplexer and then outputting the received R, G, B data blocks; a memory dispatcher, for indicating when the memory writing unit can output the R, G, B data blocks; a memory controller, for writing the R, G, B data blocks output from the memory writing unit into the memory; a memory reading unit, for reading the R, G, B data blocks from the memory through the memory controller under indication of the memory dispatcher; a request demultiplexer, wherein the request demultiplexer receives the R, G, B data blocks output from the memory reading unit, and then the request demultiplexer outputs the received R, G, B data blocks according to data request signals respectively; and a plurality of VLC decoders, for generating the data request signals, receiving the R, G, B data blocks, decoding the received R, G, B data blocks, and then outputting the decoded R, G, B data blocks respectively; wherein an order according to which the data request signals are generated corresponds to the order of the achieved percentage of the encoding progress.

Please note that, besides signals of RGB video formats, those skilled in the art can also apply the present invention to signals of other video formats, such as $YC_bC_r$ video formats, according to the principles of the present invention as disclosed herein. Moreover, the VLC encoders, the memory writing unit, the memory dispatcher, the memory controller, the memory, the memory reading unit, and the VLC decoders are well known to those skilled in the art and thus the description thereof is omitted herein for simplicity.

According to the preferred embodiment, the reordering multiplexer outputs the first data blocks respectively of R, G, B channels according to a preset order. In the preferred embodiment, the preset order corresponds to R, G, and B. Afterwards, the reordering multiplexer can determine an order by which the received R, G, B data blocks are output according to threshold signals generated correspondingly to the order of the achieved percentage of the encoding progress for each VLC encoder. Please note that, the order of the achieved percentage of the encoding progress for each VLC encoder corresponds to a required decoding order of each VLC decoder respectively.

Following the above description, the reordering multiplexer comprises: a plurality of current address indicating units, for indicating memory addresses according to which current data blocks received by the reordering multiplexer should be stored respectively; a plurality of next address indicating units, for indicating memory addresses according to which next data blocks received by the reordering multiplexer should be stored respectively; a memory address counter, for determining the memory addresses indicated by the next address indicating units; an internal memory writing unit, for writing the current data blocks into an internal memory according to the memory addresses indicated by the current address indicating units; and an internal memory reading unit, for reading each data block from the internal memory sequentially according to an order of the memory addresses and outputting the read data blocks to the memory writing unit.

Please note that, since the memory address corresponding to each data block is determined by the threshold signal and irrelevant to an order by which each data block is input into the internal memory writing unit, there is a possibility that the internal memory writing unit writes a first received data block into the internal memory prior to a second received data block; however, the internal memory reading unit reads the second received data block from the internal memory prior to the first received data block.

Additionally, when a new data block is input into the internal memory writing unit, the internal memory writing unit will write the new data block into the internal memory according to the memory address indicated by the current address indicating unit, and the memory address indicated by the next address indicating unit will be utilized for updating the memory address indicated by the current address indicating unit. The next address indicating unit then loads an unoccupied memory address according to the threshold signal and a counting value of the memory address counter. When more than one threshold signal is generated at the same time, the next address indicating units load unoccupied memory addresses according to a preset order respectively. In the preferred embodiment, the preset order corresponds to R, G, and B.

Following the above description, since the VLC decoders continuously perform decoding processes, the request demultiplexer can read the next data block (referred to as the next block for simplicity in the following description) for future decoding processes before the VLC decoders complete decoding the currently decoded data block (referred to as the current block for simplicity in the following description). According to the preferred embodiment, when the data volume not yet decoded by the VLC decoder in the current block is less than a preset value (i.e. when an achieved percentage of an decoding progress for the VLC decoder reaches a threshold value), the VLC decoder will send a data request signal to an output demultiplexer of the request demultiplexer, and thus the output demultiplexer will output the next block stored by a data buffer to the VLC decoder. Moreover, the data block read by the memory reading unit will be output to an input demultiplexer of the request demultiplexer, and thus the input demultiplexer will output the data block to the data buffer for future decoding processes according to an order by which the data block is stored into the memory. Please note that, a generating order by which the VLC decoder generates the data request signals corresponds to a generating order by which the VLC encoder generates the threshold signals.

Therefore, the encoding/decoding architecture of the present invention can continuously store encoded multichannel data without channel codes, thereby efficiently utilizing memory space.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
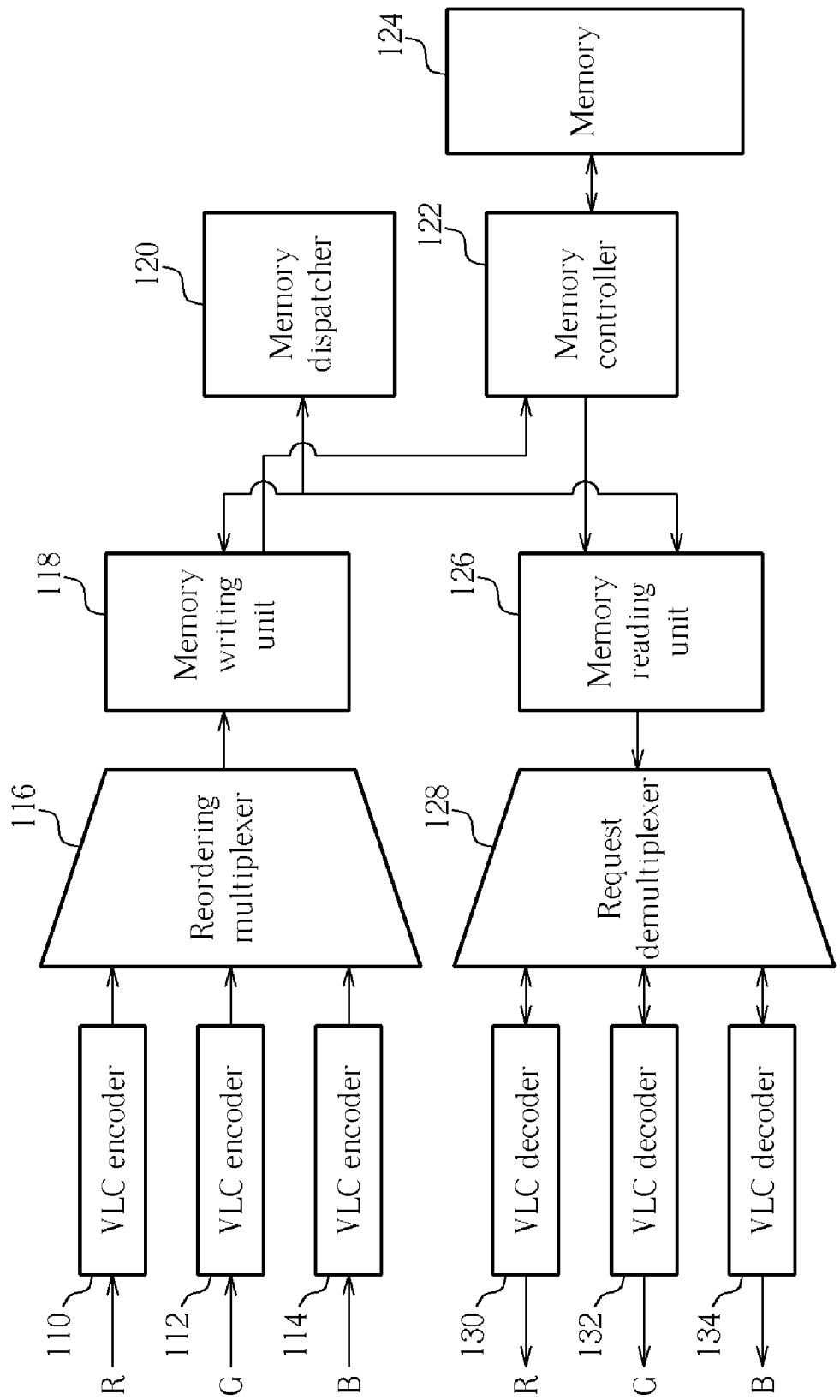
FIG. 1 is a schematic diagram illustrating an encoding/decoding architecture according to the present invention.

An embodiment of an encoding/decoding architecture of the present invention is shown in FIG. 1. As shown, the encoding/decoding architecture comprises a plurality of variable length coding (VLC) encoders 110, 112, 114, a reordering multiplexer 116, a memory writing unit 118, a memory dispatcher (or memory arbiter) 120, a memory controller 122, a memory reading unit 126, a request demultiplexer 128, and a plurality of VLC decoders 130, 132, 134. The VLC encoders 110, 112, 114 encode R, G, B video data into R, G, B data blocks respectively, output the R, G, B data blocks, and generate threshold signals R_th_reach, G_th_reach, B_th_reach according to an achieved percentage of an encoding progress thereof respectively. For example, when an achieved percentage of an encoding progress for the VLC encoder 110 to encode an R data block reaches a threshold value, the VLC encoder 110 generates a threshold signal R_th_reach. The reordering multiplexer 116 receives the encoded R, G, B data blocks R_VLC_data, G_VLC_data, B_VLC_data output from the VLC encoders 110, 112, 114 and determines an order by which the encoded R, G, B data blocks are written into a memory 124 according to a generating order by which the threshold signals R_th_reach, G_th_reach, B_th_reach are generated. The memory writing unit 118 receives the R, G, B data blocks output from the reordering multiplexer 116 and then outputs the received R, G, B data blocks. The memory dispatcher 120 indicates when the memory writing unit 118 can output the R, G, B data blocks. The memory controller 122 writes the R, G, B data blocks output from the memory writing unit 118 into the memory 124. The memory reading unit 126 reads the R, G, B data blocks from the memory 124 through the memory controller 122 under indication of the memory dispatcher 120. The request demultiplexer 128 receives the R, G, B data blocks output from the memory reading unit 126. The request demultiplexer 128 then outputs the received R, G, B data blocks according to data request signals R_REQ, G_REQ, B_REQ respectively. The VLC decoders 130, 132, 134 generate the data request signals R_REQ, G_REQ, B_REQ according to an achieved percentage of a decoding progress thereof respectively. For example, when an achieved percentage of a decoding progress for the VLC decoder 130 to decode an encoded R data block reaches a threshold value, the VLC decoder 130 generates a data request signal R_REQ. Additionally, the VLC decoders 130, 132, 134 receive the R, G, B data blocks, decode the received R, G, B data blocks, and then output the decoded R, G, B data blocks respectively. Moreover, a generating order by which the data request signals R_REQ, G_REQ, B_REQ are generated corresponds to a generating order by which the threshold signals R_th_reach, G_th_reach, B_th_reach are generated. For example, if the VLC encoder 110 generates the threshold signal R_th_reach early, the VLC decoder 130 will also generate the data request signal R_REQ correspondingly early. Please note that, in this embodiment, since the data stored in the memory 124 are all encoded by a VLC method, it is not necessary for the memory 124 to store any other information for distinguishing R, G, B channels. Moreover, besides signals of RGB video formats, those skilled in the art can also apply the present invention to signals of other video formats, such as $YC_bC_r$ video formats, according to the principles of the present invention as disclosed herein. Moreover, the VLC encoders 110, 112, 114, the memory writing unit 118, the memory dispatcher 120, the memory controller 122, the memory 124, the memory reading unit 126, and the VLC decoders 130, 132, 134 are well known to those skilled in the art and thus the description thereof is omitted herein for simplicity.

Figure 2:
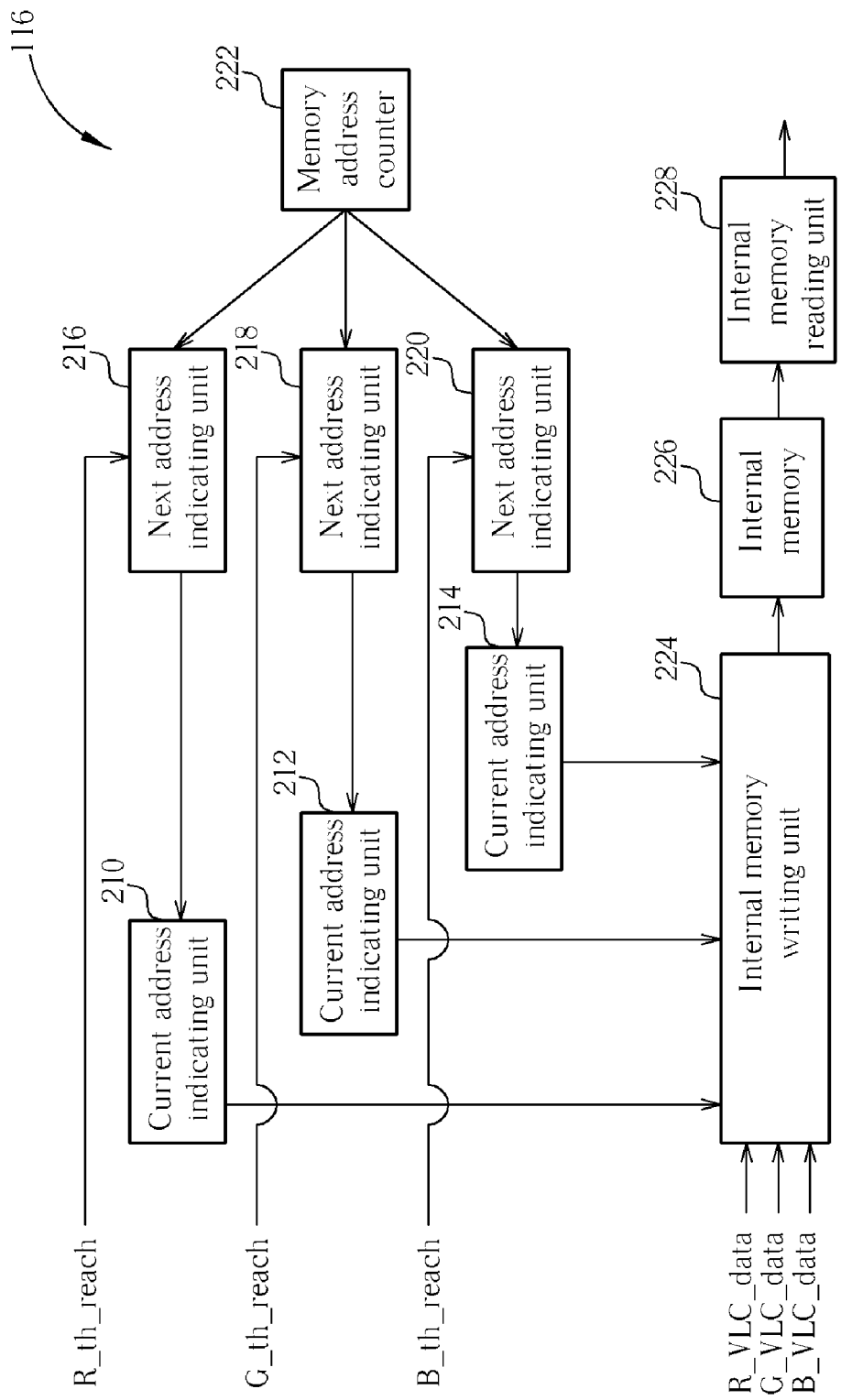
FIG. 2 is a schematic diagram illustrating an embodiment of a reordering multiplexer in FIG. 1.

Please refer to FIG. 2. FIG. 2 is a schematic diagram illustrating an embodiment of the reordering multiplexer 116 in FIG. 1. In this embodiment, the reordering multiplexer 116 outputs the first data blocks $R_0$, $G_0$, $B_0$ respectively of R, G, B channels according to a preset order. In this embodiment, the preset order corresponds to R, G, and B. Afterwards, the reordering multiplexer 116 can determine an output order by which the received R, G, B data blocks are output according to a generating order by which the threshold signals R_th_reach, G_th_reach, B_th_reach are generated. For example, suppose the reordering multiplexer 116 receives R, G, B data blocks according to an order of $R_0, R_1, R_2, G_0, B_0, R_3, G_1, B_1, R_4, R_5, R_6$, and the VLC encoders 110, 112, 114 generate the threshold signals R_th_reach, G_th_reach, B_th_reach according to an order of R_th_reach, R_th_reach, R_th_reach, G_th_reach, B_th_reach, R_th_reach, G_th_reach, B_th_reach, R_th_reach, R_th_reach, R_th_reach. The suffixes correspond to an order by which the reordering multiplexer 116 receives the R (G, or B) data blocks output from the R (G, or B) channel. In such a case, the reordering multiplexer 116 will output the first data blocks $R_0, G_0, B_0$ respectively of the R, G, B channels according to the preset order and then output the remaining data blocks $R_1, R_2, R_3, G_1, B_1, R_4, R_5, R_6$ according to the generating order by which the threshold signals are generated.

Following the above description, the reordering multiplexer 116 comprises a plurality of current address indicating units 210, 212, 214, a plurality of next address indicating units 216, 218, 220, a memory address counter 222, an internal memory writing unit 224, and an internal memory reading unit 228. The current address indicating units (such as registers) 210, 212, 214 indicate memory addresses according to which current data blocks received by the reordering multiplexer 116 should be stored respectively. The next address indicating units (such as registers) 216, 218, 220 indicate memory addresses according to which next data blocks received by the reordering multiplexer 116 should be stored respectively. The memory address counter 222 determines the memory addresses indicated by the next address indicating units 216, 218, 220. The internal memory writing unit 224 writes the current data blocks into an internal memory 226 according to the memory addresses indicated by the current address indicating units 210, 212, 214. The internal memory reading unit 228 reads each data block from the internal memory 226 sequentially according to an order of the memory addresses and outputs the read data blocks to the memory writing unit 118 of FIG. 1. Please note that, since the memory address corresponding to each data block is determined by the generating order of the threshold signals R_th_reach, G_th_reach, B_th_reach and irrelevant to an order by which each data block is input into the internal memory writing unit 224, there is a possibility that the internal memory writing unit 224 writes a first received data block into the internal memory 226 prior to a second received data block; however, the internal memory reading unit 228 reads the second received data block from the internal memory 226 prior to the first received data block. For example, suppose three data blocks are input into the internal memory writing unit 224 according to an order of $R_1, B_1, G_1$, and the threshold signals are generated according to a generating order of R_th_reach, G_th_reach, B_th_reach. In such a case, a reading order of the data blocks is $R_1, G_1, B_1$ that is determined by the generating order of the threshold signals R_th_reach, G_th_reach and B_th_reach. Therefore, the internal memory writing unit 224 will write the three data blocks into the internal memory 226 according to the order of $R_1, B_1, G_1$ and the memory addresses corresponding to the three data blocks $R_1, B_1, G_1$ (which are determined by the generating order of the threshold signals, i.e. R_th_reach, G_th_reach, B_th_reach), so the internal memory reading unit 228 will read the data blocks according to an order of $R_1, G_1, B_1$.

Additionally, when a new data block, such as an R data block R_VLC_data, is input into the internal memory writing unit 224, the internal memory writing unit 224 will write the new R data block R_VLC_data into the internal memory 226 according to the memory address indicated by the current address indicating unit 210, and the memory address indicated by the next address indicating unit 216 will be utilized for updating the memory address indicated by the current address indicating unit 210. The next address indicating unit 216 then loads an unoccupied memory address according to the threshold signal R_th_reach and a counting value of the memory address counter 222. When more than one threshold signal (for example, three threshold signals R_th_reach, G_th_reach, B_th_reach) is generated at the same time, the next address indicating units 216, 218, 220 load unoccupied memory addresses according to a preset order respectively.

Figure 3:
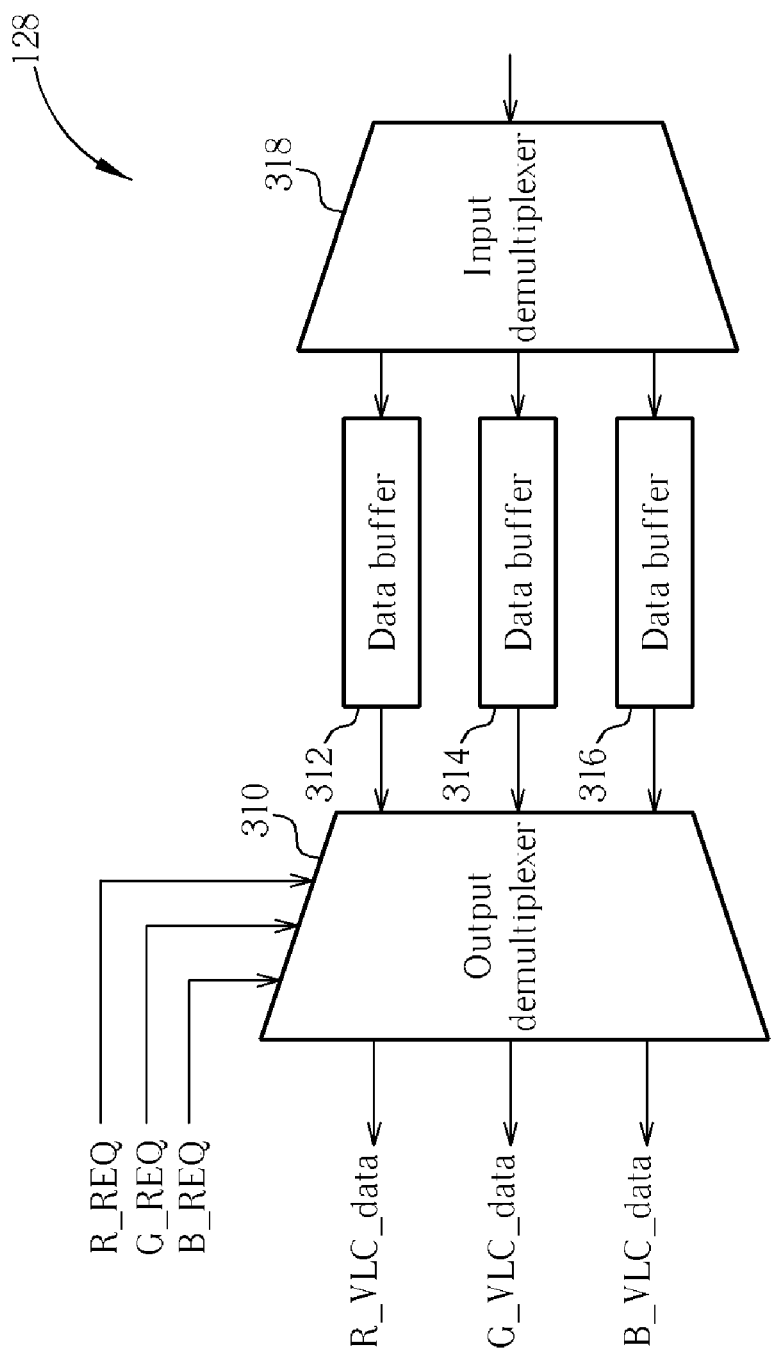
FIG. 3 is a schematic diagram illustrating an embodiment of a request demultiplexer in FIG. 1.

Following the above description, since the VLC decoders 130, 132, 134 continuously perform decoding processes, the request demultiplexer 128 can read the next data block (referred to as the next block for simplicity in the following description) for future decoding processes before the VLC decoders 130, 132, 134 complete decoding the currently decoded data block (referred to as the current block for simplicity in the following description). Please refer to FIG. 3. FIG. 3 is a schematic diagram illustrating an embodiment of the request demultiplexer 128 in FIG. 1. In this embodiment, when the data volume not yet decoded by one of the VLC decoders 130, 132, 134 in the current block is less than a preset value (i.e. when an achieved percentage of an decoding progress for one of the VLC decoders 130, 132, 134 to decode the current block reaches a threshold value), the VLC decoder (130, 132, or 134) will send one of the data request signals R_REQ, G_REQ, B_REQ correspondingly to an output demultiplexer 310 of the request demultiplexer 128, and thus the output demultiplexer 310 will output the next block stored by a data buffer 312, 314, or 316 to the VLC decoder (130, 132, or 134) correspondingly. For example, when the VLC decoder 130 sends the data request signal R_REQ to the output demultiplexer 310, the output demultiplexer 310 will output the next data block R_VLC_data stored in the data buffer 312 to the VLC decoder 130. Moreover, the data block read by the memory reading unit 126 will be output to an input demultiplexer 318 of the request demultiplexer 128, and thus the input demultiplexer 318 will output the data block to the data buffer 312, 314, or 316 according to an order by which the data block is stored into the memory 124. For example, if the data blocks are stored into the memory 124 according to an order of $R_0, G_0, B_0, R_1, R_2, R_3, G_1, B_1, R_4, R_5, R_6$, the input demultiplexer 318 will utilize the above order to output the data block $R_0$ to the data buffer 312, the data block $G_0$ to the data buffer 314, the data block $B_0$ to the data buffer 316, the data blocks $R_1, R_2, R_3$ to the data buffers 312, 314, 316 respectively, the data block $G_1$ to the data buffer 312, and so on.

Those skilled in the art will readily observe that numerous modifications and alterations of the device and method may be made while retaining the teachings of the invention.

What is claimed is:

1. An image encoding/decoding device, comprising:
   an encoding circuit, for receiving and encoding a plurality of image data to output a plurality of data blocks, wherein for each block of the image data, the encoding circuit generates a corresponding threshold signal when an achieved percentage of an encoding process reaches a threshold value;
   a multiplexer, coupled to the encoding circuit, wherein the multiplexer receives the data blocks and the threshold signals corresponding to the data blocks, and the multiplexer outputs the data blocks and determines memory addresses, respectively corresponding to the data blocks, of a storage unit according to a first order, and the first order is a generating order of the corresponding threshold signals;

a writing circuit, coupled to the multiplexer, for writing the data blocks into the storing circuit according to the determined memory addresses;

a reading circuit, coupled to the storing circuit, for reading the data blocks from the storing circuit;

a demultiplexer, coupled to the reading circuit, wherein the demultiplexer receives the data blocks output from the reading circuit, and the demultiplexer outputs the data blocks according to a second order; and a decoding circuit, coupled to the demultiplexer, for receiving the data blocks output from the demultiplexer and decoding the data blocks to generate the image data, wherein the decoding circuit determines the second order according to an achieve percentage of a decoding process of each of the data blocks;

wherein the first order and the second order are substantially the same.

2. The device of claim 1, wherein the encoding circuit comprises a plurality of encoding units, and the decoding circuit comprises a plurality of decoding units.

3. The device of claim 2, wherein each encoding unit is coupled to an image data input channel, and each decoding unit is coupled to an image data output channel.

4. The device of claim 1, wherein the encoding circuit is a variable length coding (VLC) encoding circuit, and the decoding circuit is a VLC decoding circuit.

5. The device of claim 1, wherein an order according to which the multiplexer receives the data blocks is different from the first order.

6. The device of claim 1, wherein the image data are data complying with a RGB format or a $YC_bC_r$ format.

7. The device of claim 1, wherein the multiplexer comprises:

an internal memory writing unit, coupled to the encoding circuit, for receiving the data blocks;

a memory address indicating circuit, coupled to the internal memory writing unit, for determining memory addresses corresponding to the data blocks;

an internal memory, coupled to the internal memory writing unit, wherein the internal memory writing unit writes the data blocks into the internal memory according to the memory addresses corresponding to the data blocks; and an internal memory reading unit, coupled to the internal memory, for reading the data blocks from the internal memory according to the memory addresses corresponding to the data blocks and outputting the read data blocks to the writing circuit.

8. The device of claim 7, wherein the memory address indicating circuit determines the memory addresses corresponding to the data blocks according to the first order.

9. The device of claim 8, wherein the memory address indicating circuit comprises:

a current address indicating circuit, coupled to the internal memory writing unit, for indicating the memory addresses corresponding to the data blocks;

a next address indicating circuit, coupled to the current address indicating circuit, for updating the memory addresses indicated by the current address indicating circuit; and a memory address counter, coupled to the next address indicating circuit, for providing available memory addresses in the internal memory.

10. The device of claim 1, wherein the demultiplexer comprises:

an input demultiplexer, coupled to the reading circuit, for receiving the data blocks output from the reading circuit and then outputting the data blocks;

a buffer circuit, coupled to the input demultiplexer, for receiving and temporarily storing the data blocks; and an output demultiplexer, coupled to the decoding circuit and the buffer circuit, for outputting the data blocks temporarily stored by the buffer circuit to the decoding circuit under the control of the decoding circuit.

11. The device of claim 10, wherein the buffer circuit comprises a plurality of buffers, and the number of the buffers are in direct proportion to an output channel number contained in the decoding circuit.

12. The device of claim 1, wherein the storing circuit comprises:

a memory controller, coupled to the writing circuit and the reading circuit, for receiving the data blocks output from the writing circuit thus to write the data blocks into a memory and reading the data blocks from the memory thus to output the data blocks to the reading circuit; and a memory dispatcher, coupled to the writing circuit and the reading circuit, for indicating when the writing circuit is allowed to output the data blocks to the memory controller and when the reading circuit is allowed to read the data blocks from the memory through the memory controller.

13. An image encoding/decoding method, comprising:

receiving and encoding a plurality of image data to generate a plurality of data blocks, and for each block of the image data, generating a corresponding threshold signal when an achieved percentage of an encoding process reaches a threshold value;

determining memory addresses, respectively corresponding to the data blocks, of a storage unit according to a first order, wherein the first order is a generating order of the corresponding threshold signals;

storing the data blocks into the storage unit according to the determined memory addresses;

reading the data blocks;

generating a plurality of data request signals according to a second order; and decoding the data blocks according to the second order to generate the image data, and determining the second order according to an achieve percentage of a decoding process of each of the data blocks;

wherein the first order and the second order are substantially the same.

14. The method of claim 13, wherein the step of encoding the image data comprises utilizing a VLC encoding method to encode the image data, and the step of decoding the data blocks comprises utilizing a VLC decoding method to decode the data blocks.

15. The method of claim 13, wherein the image data are data complying with a RGB format or a $YC_bC_r$ format.

16. The method of claim 13, wherein an order according to which the data blocks are generated is different from the second order.

* * * * *